Dec. 8, 1942. A. E. P. MILNER 2,304,190
APPLIANCE FOR MOLDING HOLLOW RUBBER BALLS AND THE LIKE
Filed March 26, 1940 3 Sheets-Sheet 1

INVENTOR
Arthur Edward Peel Milner

INVENTOR
Arthur Edward Peel Milner
By
his ATTY.

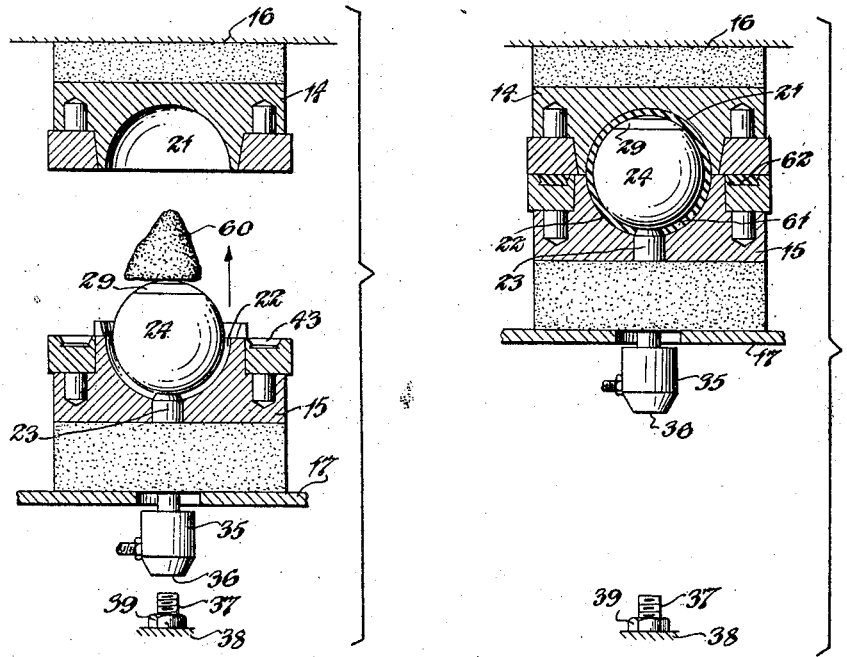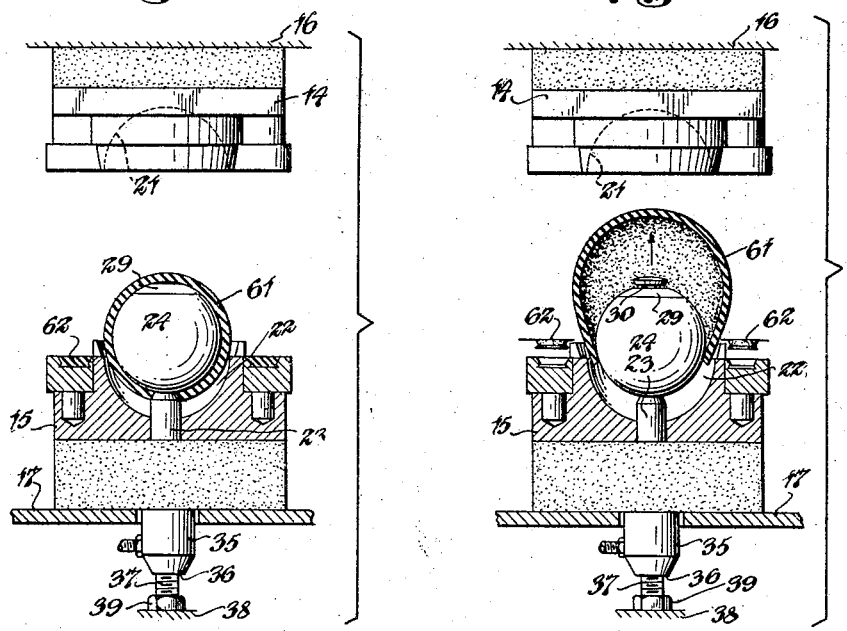

Patented Dec. 8, 1942

2,304,190

UNITED STATES PATENT OFFICE 2,304,190

APPLIANCE FOR MOLDING HOLLOW RUBBER BALLS AND THE LIKE

Arthur Edward Peel Milner, Melbourne, Victoria, Australia

Application March 26, 1940, Serial No. 325,974
In Australia March 30, 1939

5 Claims. (Cl. 18—42)

REISSUED

This invention relates to improvements in appliances for molding hollow rubber articles such as spherical balls and spherical or ovoid spray bulbs. In this specification the term "ball" is used for conciseness and is intended to include balls and other spherical or ovoid hollow articles formed by pressing suitable rubber stock around a core in a mold.

More especially this invention relates to improvements in a known molding appliance of the kind which includes a two part mold in each part of which is a cavity, (the said cavities registering to form a molding chamber when the mold parts are closed together), a stem projecting from one part of the mold into the cavity therein, a core supported by the said stem and means to heat each mold part. In such known appliance rubber stock is molded around the core, (which is preheated) and cured, usually to the extent known as a light semi-cure after which the core (with the partly cured ball around it) is removed from the stem and the ball is then removed from the core. The arrangement of the core on the supporting stem and the removal of the core from the said stem cause undesirable wear and the repeated heating and cooling of the core also has undesirable results.

In a rubber ball for use in playing tennis it is very important that the wall of the ball shall be of equal thickness throughout, and that the finished ball shall be accurate as to weight, compression, flight and bounce. Any inaccuracy in the mold and/or any variation in the curing temperature may cause the production of faulty balls and with the known appliance the percentage of imperfect balls is undersirably high.

The primary object of this invention is to provide an improved molding appliance of the kind referred to with which hollow rubber balls of high quality may be produced rapidly and economically.

Another object of this invention is to provide an improved molding appliance of the kind referred to in which manual operations are reduced to a considerable extent, the possibility of error is obviated and the before-mentioned disadvantages are avoided.

In an appliance for molding a hollow rubber ball according to this invention, the core is fixed relatively to a supporting stem, the said stem is movable relatively to the mold part with which it is associated (when the mold parts are separated) so that the core may be displaced and passages are provided through which suitable gas or vapour (such as air or steam) under pressure may be supplied to the interior of the ball on the said core to expand the ball to such an extent that it is displaced entirely or to such an extent that it may be removed readily. In this specification the term "air" is used for conciseness to include suitable gas or vapour.

An appliance for molding a hollow rubber ball according to this invention, includes a mold that is formed of separable parts, a recess in each mold part arranged (when the mold parts are closed together) to form a molding chamber of suitable size and shape, a core of suitable size and shape, a stem on which the said core is fixed, slidably arranged relatively to one of the said mold parts, means whereby (when the mold sections are separated) the said core is moved away from the mold recess with which it is associated, means to heat each said mold section and the said core, a passage through the said core and a passage through the said stem and means to supply air under pressure through the said passages to the interior of a molded hollow ball on the said core. Means are provided whereby the core supporting stem may be adjusted relatively to the mold so that the position of the core relatively to the molding chamber may be accurately regulated. One or more recesses may be provided in the mold, each to form a wad or disc to be arranged in the hole formed in the ball by the core supporting stem.

But in order that this invention may be more readily understood a practical embodiment thereof will now be described with reference to the accompanying drawings in which:

Fig. 3 is a vertical section of one of the molds shown in Fig. 1, on a larger scale;

Fig. 4 is a plan of the upper face of the lower part of the mold shown in Fig. 3;

Fig. 6 is a large scale fragmentary vertical section of parts shown in Fig. 3, with the mold parts separated;

Fig. 10 is a diagrammatic vertical section showing a mold in the open position (that is with the mold parts separated) with a block of rubber stock on the core;

Fig. 11 is a similar view to Fig. 10 but with the mold parts closed together and with the rubber stock molded to form a ball on the core;

Fig. 12 is a similar view to Fig. 10 (but showing the mold upper part in elevation) with the mold parts separated and the core displaced relatively to the mold lower part;

Fig. 13 is a similar view to Fig. 12 but with the molded ball expanded by air pressure and displaced from the core so that it may be moved readily.

Figure 1:
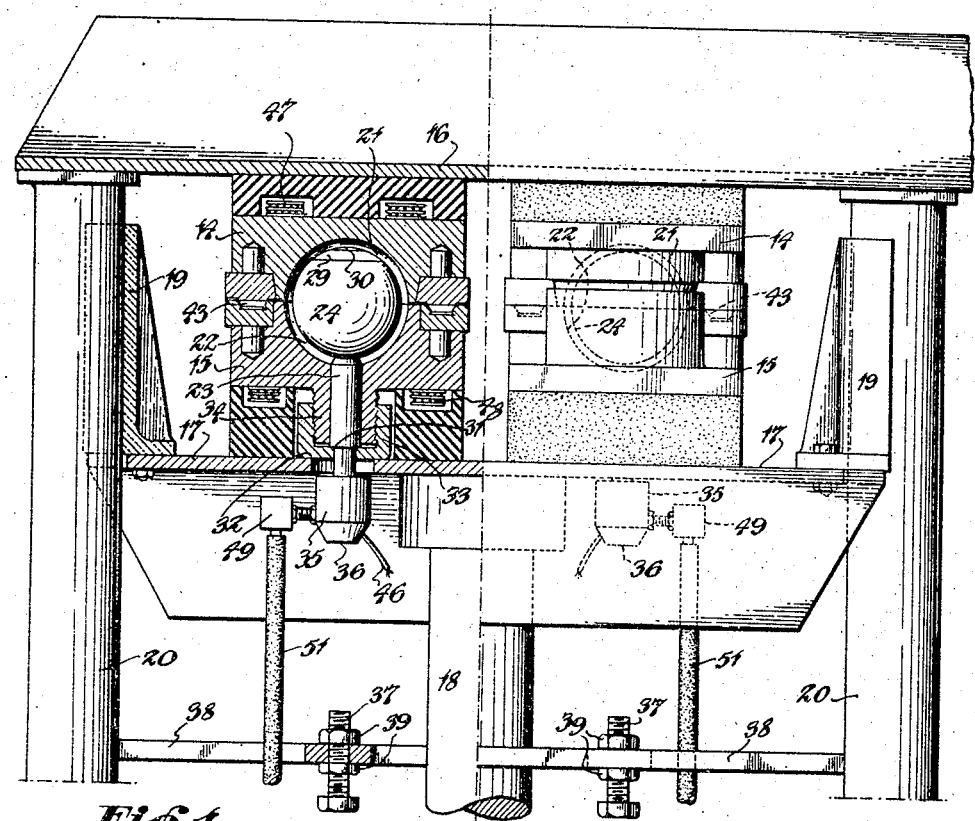
Fig. 1 is a side view partly in elevation and partly in vertical section, showing a two unit molding appliance with the mold parts in the closed position.

14 is the mold upper part and 15 the mold lower part. The mold upper part 14 is fixed relatively to framing 16 and the mold lower part 15 is mounted on a base 17 that is supported on a plunger 18. The said plunger is adapted to be actuated by any suitable well known means such as hydraulically operated mechanism (not shown) to reciprocate the said lower part 15 relatively to the said upper part 14 at timed intervals. Shoes 19 on the base 17 slidably engage bars 20 to guide the base 17. The arrangement shown in Figs. 1 and 2 includes two molds but it will be understood that each assembly may include only one mold or more than two molds. Hemi-spherical recesses 21, 22 in the respective mold parts 14 and 15 are arranged in registry so that each pair of recesses forms a spherical chamber when the mold parts are closed together.

A hollow stem 23 is slidably arranged in each movable mold part 15 and a core 24 is fixed on each said stem by a nut 26, the head of which is housed in a clearance 27 in the said core. An outlet 28 in a cap piece 29 above the clearance 27 is closed by a valve 30.

A shoulder 31 on the exterior of the hollow stem 23 seats on landing 32 when the said stem is in the normal position. Landing 32 is part of a nut 33 screwed on a neck 34 on the mold part 15, and is adjustable relatively thereto. The lower face of the nut 33 is arranged to abut against the base 17 when the mold parts are closed together (see Fig. 1) and so relieve pressure on the screw thread of the said nut during molding.

A cap 35 on the lower end of the stem 23 has a striking face 36 that is adapted to contact with a stop 37 when the mold part 15 is in the lowest position. Stop 37 is adjustable relatively to a frame member 38 and is fixed in adjusted position by nuts 39.

Spew ways 40 permit excess rubber to flow from the mold chamber formed by the recesses 21, 22. The edge parts 41, 42 of the mold parts 14 and 15 respectively are arranged to sever the rubber web extruded between adjacent faces of the mold parts. A small mold cavity 43 in each spew way is filled with rubber, to form a flat wad or disc 62 that may be used to fill the hole formed by the stem 23 in a molded shell 61.

An electrical element 44 is arranged in a groove 45 at the lower part of the clearance 27. An electrical conductor 46 to connect the element 44 to an electrical circuit passes through the hollow core supporting stem and is suitably insulated therefrom. Another conductor 46a is grounded to the core 24. The conductor 46 may be connected to a low voltage circuit that is controlled by a resistor in known manner. The electrical heating element 47 is arranged above the upper mold part 14 and another electrical heating element 48 is arranged below the lower mold part 15 so that each said mold part may be heated to the desired temperature which may be thermostatically controlled in known manner.

Figure 7:
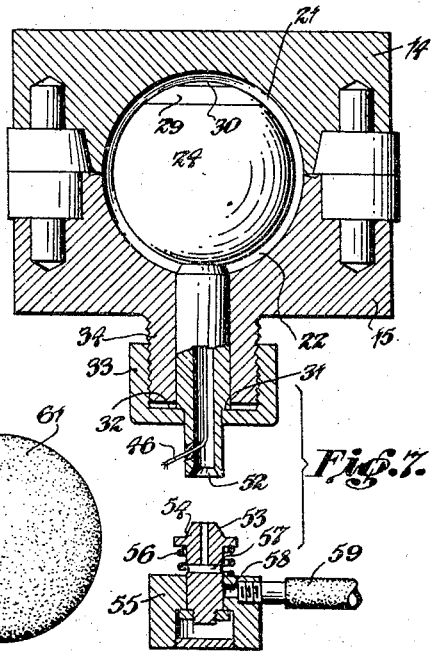
Fig. 7 is a central vertical section of a mold having modified air supply means.
Figure 9:
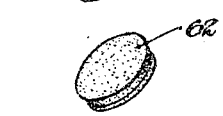
Fig. 9 is a perspective view on a larger scale, of a closure wad or plug for the hole in the ball shown in Fig. 8.
Figure 8:
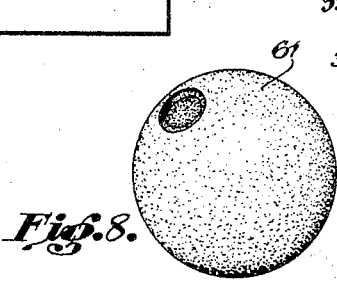
Fig. 8 is a perspective view of a ball produced in a mold of the kind in Figs. 1 to 7.

In the arrangement shown in Figs. 1 to 3 and Figs. 10 to 13, a connector 49 on the cap 35 carries a nipple 50 from which a flexible tube 51 extends to a supply of air under pressure that may be controlled manually or in any other suitable manner. The interior of cap 35 is connected by a passage 23a in stem 23, and a passage 26a through nut 26 to chamber 27. In the modified construction shown in Fig. 7 a seating 52 in the lower end of the hollow stem 23 is adapted (when the mold part 15 reaches the lowest position) to press a nipple 53 on a movable plug 54 slidably supported in a carrier 55. Plug 54 is normally pressed upwardly by a spring 56. The plug seals the inlet 58 from air supply 59. A passage 57 through the plug 54 is adapted (when said plug is depressed) to register with inlet 58.

Figure 2:
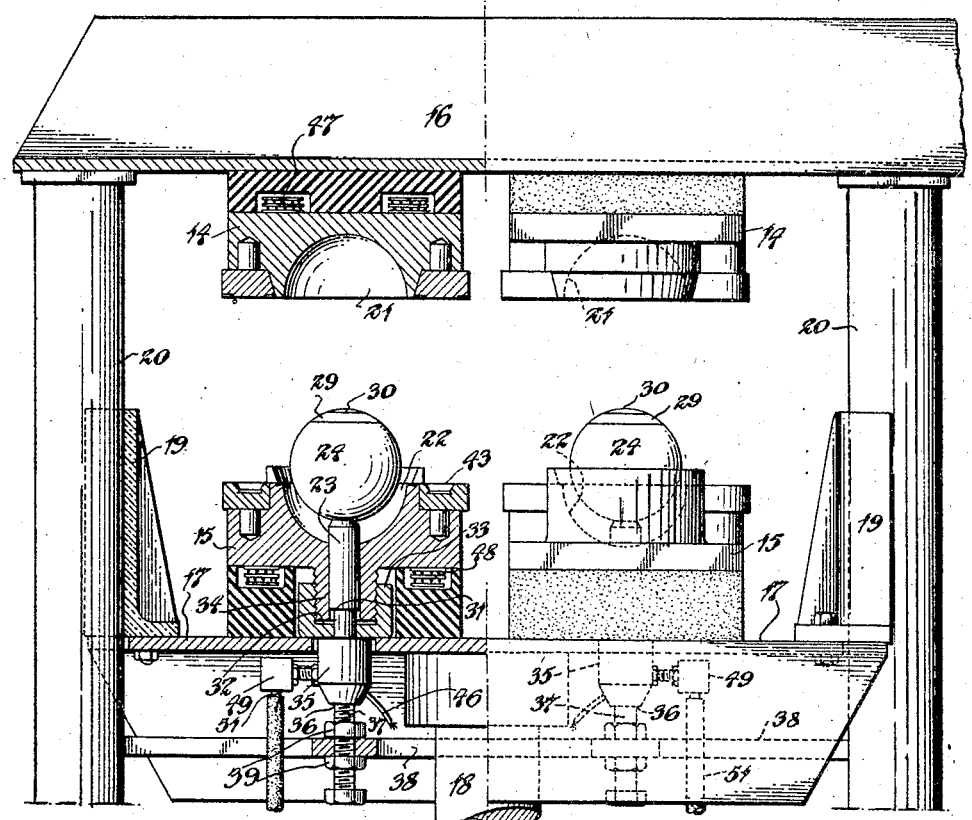
Fig. 2 is a similar view to Fig. 1 but with the mold parts separated.
Figure 5:
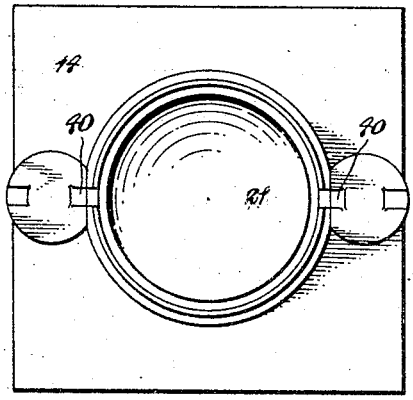
Fig. 5 is an inverted plan of the under face of the upper part of the mold shown in Fig. 3.

In use, the mold parts 14 and 15 being separated as shown in Figs. 2 and 10, a suitable quantity of rubber stock (which may be preheated) is placed on the core either during a rest period or while the mold lower part is moving toward the closed position. The rubber stock is preferably a conical or pyramidal plug 60, the shape being such that the flow of the rubber is facilitated. As the mold closes, the rubber stock is heated to plastic condition and is distributed around the core until the molding chamber is filled to form a ball 61. The mold parts 41 and 42 sever any spew or any fin that may remain. Such spew or fin is so thin at the part near the ball 61, that it can be detached readily. The means to actuate the plunger 18 may be arranged so that the mold lower part 15 rests for a short period just before it is fully closed, to ensure that the rubber will be sufficiently heated to ensure that the rubber will flow to fill all parts of the mold chamber. The mold is held in the closed position for a sufficient period to cure the rubber to the desired extent, for example a light semicure, after which the mold lower part is moved downwardly. In the construction shown in Figs. 1 to 3 and Figs. 10 to 13 the face 36 of cap 35 meets the stop 37 when the said mold lower part is near the end of the downward travel and lifts the stem 23 and the core 24 to the position shown in Figs. 2 and 12, after which an air control valve is operated as before described and air under pressure flows through passages 23a and 26a and clearance 27, lifts valve 30 and enters the interior of the molded ball 61 until the latter is displaced (as shown in Fig. 13) so that it leaves the core or may be removed therefrom. In the construction shown in Fig. 7 the lower end of stem 23 meets the nipple 53 when the mold part is near the lower end of its travel and displaces the said stem 23 and the core 24 relatively to the mold part 15, after which the said stem depresses the plunger 54 until the passage 57 registers with the air inlet 58, and allows air to flow through passages 23a and 26a and clearance 27 as before described.

The ram 18 may be controlled in such manner that the parts are actuated in a timed cycle in manner well understood and a plurality of molds may be arranged to operate in timed relationship, in such manner that there is little or no loss of time during the cycle of operations.

What I claim is:

1. Apparatus for molding a hollow rubber ball or the like, of the kind in which plastic rubber stock is molded around a core supported in a chamber in a mold formed of separable sections, said apparatus comprising a support projecting through one section of said mold into the same and being movable relatively to the mold, a core fixed on the inner end of said support, the said core and the said support being formed with air passages to admit air under pressure to the interior of a ball or the like on the said core to expand the said ball or the like and cause it to be displaced relatively to the said core, and a member adjustable relatively to the mold section, through which the said support projects, the said member being arranged to form a seating for said core support when the latter is in molding position.

2. An apparatus for molding a hollow rubber ball or the like as claimed in claim 1, in which the section of the mold having said support projecting therethrough is movable and has a neck through which the said support passes and a flanged sleeve adjustably mounted on the said neck, said support having a shoulder adapted to seat on the flange of said sleeve when the core is in the molding position.

3. Apparatus for molding a hollow rubber ball or the like comprising a mold formed of separable sections, comprising a fixed part and a movable part, a mold chamber in the said sections, a core arranged in the said chamber, a support for the said core, the core being fixed on the said support the latter projecting through and being axially movable relatively to said movable part of the mold, a member adjustable relatively to the movable mold part, said member being arranged to form a seat for said core support when the mold is in molding position, a passage through the said core and the said support through which air under pressure may be admitted to the interior of the ball or the like on the said core, and means to move the core support axially relative to the movable mold part when the latter approaches the full open position.

4. Apparatus for molding a hollow rubber ball or the like comprising a two part mold the upper part of which is fixed and the lower part of which is movable relatively to the said fixed part, a recess in each mold part to form a molding chamber when the said mold parts are closed together, a core, a support for the said core, said support projecting slidably through the movable mold part, a member adjustable relatively to the movable mold part, said member being arranged to form a seat for said core support when the mold is in molding position, an air passage through the said support and the said core and a valve to close the outlet end of the said passage, the said valve when closed forming part of the molding face of the said core.

5. Apparatus for molding a hollow rubber ball or the like comprising a two part mold the upper part of which is fixed and the lower part of which is movable relatively to the said fixed part, a recess in each mold part to form a molding chamber when the said mold parts are closed together, a core, a support for the said core, said support projecting slidably through the movable mold part, a member adjustable relatively to the movable mold part, said member being arranged to form a seat for said core support when the mold is in molding position, an air passage through the said support and the said core and a valve to close the outlet end of the said passage, the said valve when closed forming part of the molding face of the said core, an abutment face on the lower end of the core support, and an adjustable stop arranged to cooperate with said abutment face and to move the core support axially relatively to the movable mold part when the latter approaches the full open position.

ARTHUR EDWARD PEEL MILNER.